United States Patent [19]
Metraux

[11] Patent Number: 5,254,187
[45] Date of Patent: Oct. 19, 1993

[54] ANTI-SKID DEVICE FOR VEHICLE WHEELS

[75] Inventor: Michel Metraux, Pully, Switzerland

[73] Assignee: Autotyp S.A., Switzerland

[21] Appl. No.: 826,481

[22] Filed: Jan. 24, 1992

[30] Foreign Application Priority Data

Jan. 24, 1991 [CH] Switzerland ............................ 207/91

[51] Int. Cl.$^5$ ............................................. B60C 27/14
[52] U.S. Cl. ..................... 152/216; 152/170; 152/213 R; 301/40.1; 301/37.38
[58] Field of Search ................... 152/168, 170, 213 R, 152/231, 223, 239, 241, 242, 217, 216; 301/37 S, 37 SC, 40 S, 41 R, 38 R, 40 R

[56] References Cited

U.S. PATENT DOCUMENTS

| | | | |
|---|---|---|---|
| 2,851,309 | 9/1958 | Lyon | 301/37 SC |
| 4,209,049 | 6/1980 | Regensburger | 152/216 |
| 4,388,754 | 6/1983 | Ilon | 152/213 R X |
| 4,549,591 | 10/1985 | Hyggen | 152/216 X |
| 4,799,522 | 1/1989 | Ilon | 152/241 X |
| 4,903,746 | 2/1990 | Preusker et al. | 152/216 |
| 4,922,982 | 5/1990 | Metraux | 152/241 X |

FOREIGN PATENT DOCUMENTS

| | | |
|---|---|---|
| 0469794 | 11/1950 | Canada . |
| 0583097 | 9/1959 | Canada . |
| 214623 | 3/1987 | European Pat. Off. . |
| 376426 | 7/1990 | European Pat. Off. . |
| 376428 | 7/1990 | European Pat. Off. . |
| 0822498 | 11/1951 | Fed. Rep. of Germany . |

Primary Examiner—Michael W. Ball
Assistant Examiner—Francis J. Lorin
Attorney, Agent, or Firm—Ostrolenk, Faber, Gerb & Soffen

[57] ABSTRACT

The anti-skid device includes a housing capable of being removably fastened on an outer side of a vehicle wheel. An anti-skid travel path, formed of chains, is connected to a plurality of radial arms of the housing. The chains are automatically positioned on the wheel of the vehicle upon advancement of the vehicle, when an elastic member extending through the housing pulls the housing in a direction towards the wheel. A lever is provided between the housing and the wheel and includes an extension which extends through a radial passage of a fastening device connected to a nut of the wheel.

14 Claims, 4 Drawing Sheets

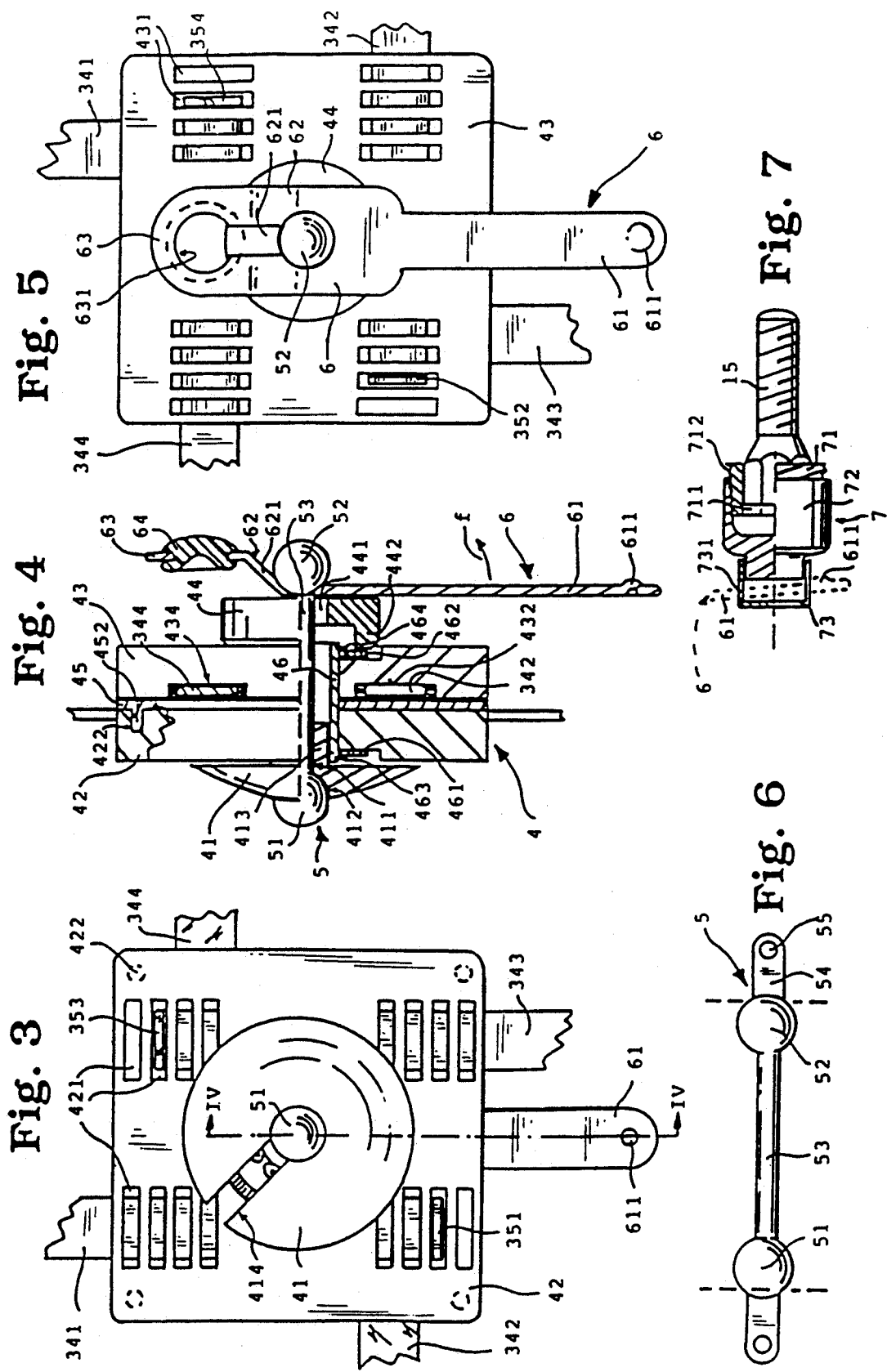

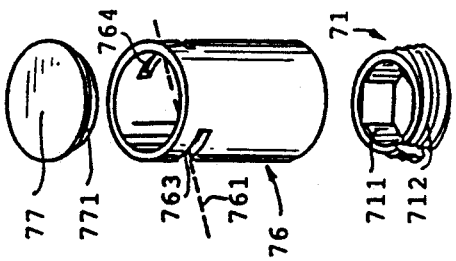
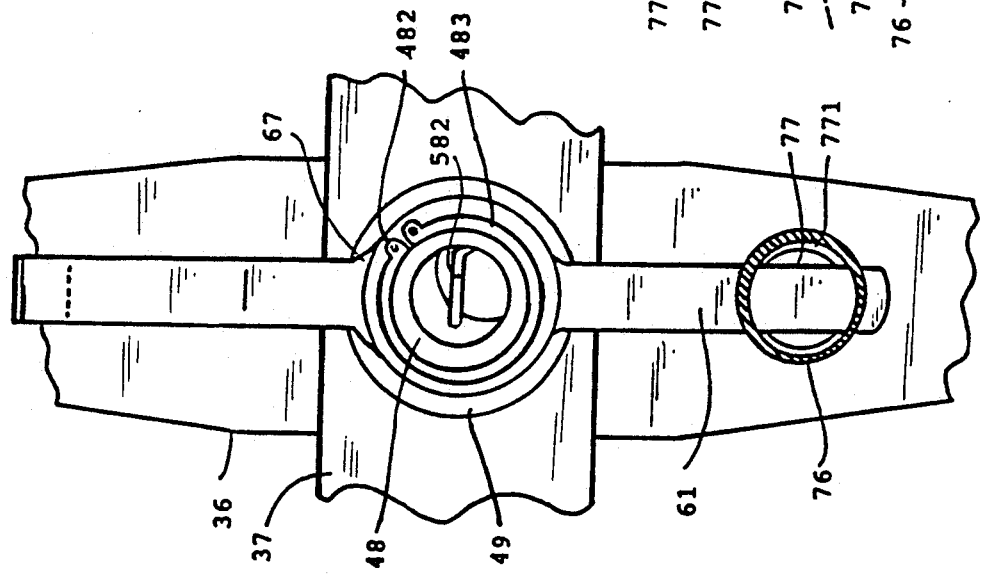
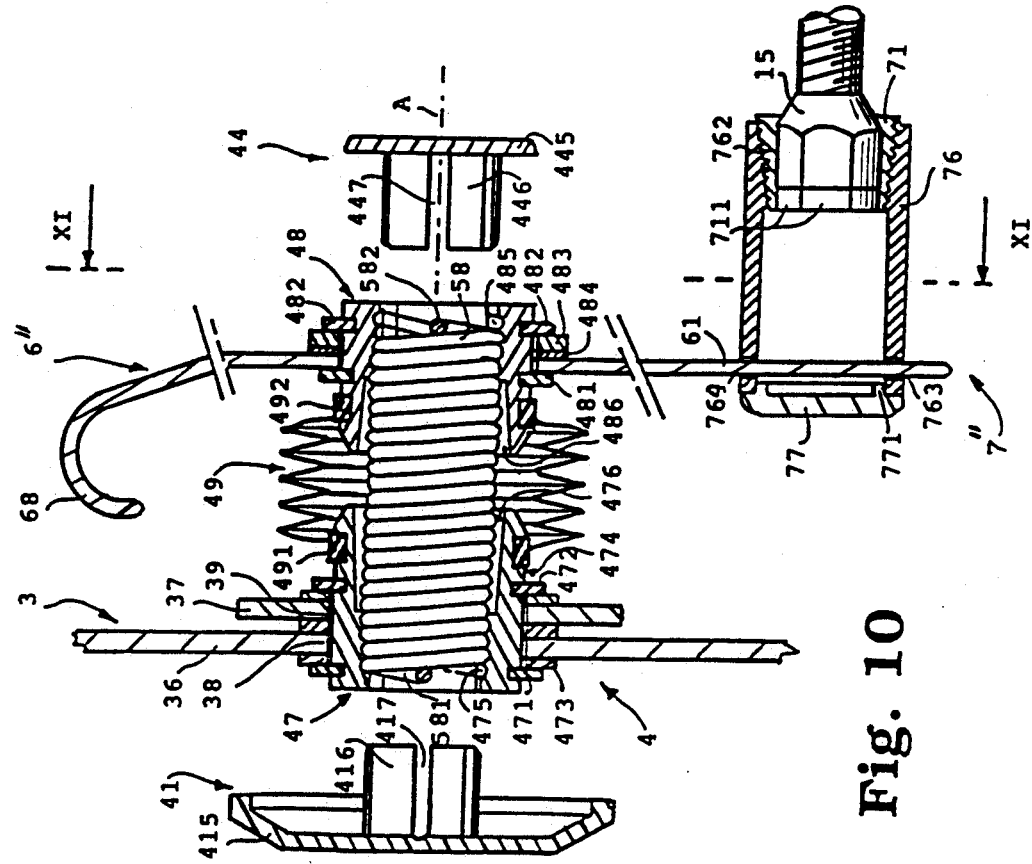

# ANTI-SKID DEVICE FOR VEHICLE WHEELS

BACKGROUND OF THE INVENTION

1. Field of the Invention

The present invention relates to the field of anti-skid devices for vehicle wheels and, more particularly, to a unit of the snow-chain type adapted to be automatically positioned on the periphery of the tire upon advancement of the vehicle.

2. Description of the Prior Art

Such a system is known from Swiss Patent 657.812 which describes the basic principle of an anti-skid device arrangement comprising one or more chains which are borne at one end of radial arms and the other end of which is applied along the axis of the wheel by elastic traction devices arranged on the outer face of the wheel.

In Applicant's EP Patent A-312.636, there is described more particularly a type of central housing having, on the one hand, the radial arms bearing the chains and, on the other hand, means for pulling in the direction of the axis of the wheel. European Patent A-351.362 describes an anti-skid travel path which permits the automatic tensioning of the chains on the periphery of the tire.

In these different patents, the system for pulling the unit in the direction of the axis of the wheel is established in all cases by elastic means fixed at at least three points on the rim, in order to hold the central housing on the axis of the wheel and pull it in the direction thereof, so as to maintain the snow chain on the periphery of the tire.

In order to simplify the mounting, it has been attempted to effect a single attachment which permits the mounting, removable at will by the user, of an anti-skid device such as described above. In European Patents EP-A-376.426 and EP-A-376.428 a system is described for mounting on one of the fastening nuts of the wheel by means of a connecting part intended to cooperate with the central housing. It is necessary to tension this spring which is intended to apply and maintain the device in operating position. The drawbacks of such a system are that, after having fastened the connecting part to the wheel of the vehicle, the user must still effect the tensioning of the elastic means. Furthermore, tests have shown that the rotation between the connecting part and the point of attachment is detrimental to the proper operation of the anti-skid device, while the turning of the snow chain, and therefore of the housing, with respect to the axis of rotation of the wheel is indispensable.

SUMMARY OF THE INVENTION

The present invention is directed at overcoming the drawbacks described above and has as its object an anti-skid device for a vehicle wheel comprising a housing intended to be removably fastened on the outer side of the wheel. The housing bears radial arms on the outer end of which an anti-skid travel path is arranged and connected with elastic traction means adapted to turn freely with respect to the housing and capable of pulling the housing along the axis of the wheel in the direction thereof, so as to place the travel path on the peripheral surface of the wheel. This device is characterized by the fact that the housing has a lever extending on the side of the housing facing the wheel and connected to the housing by the elastic means. The lever includes an extension adapted to cooperate removably with fastening means located on the wheel, and by the fact that the fastening means have a passage which is radial with respect to the axis of the wheel. The passage is adapted to permit the extension of the lever to be introduced and slide freely relative to the fastening means.

In a preferred variant, the fastening means are formed of a split ring having on its inside the outer shape of a wheel attachment bolt and on the outside a conical thread; and a cap having on the inside a conical thread and on the outside gripping means.

The accompanying drawings show embodiments of the objects of the invention by way of non-limitative examples.

BRIEF DESCRIPTION OF THE DRAWINGS

FIG. 3 is a side view of the central housing seen from the side opposite the wheel;

FIG. 4 is an end view of the central housing, with a section along the line IV—IV of FIG. 3 through the elements located in the lower half of the figure.

FIG. 5 is a side view of the central housing seen from the side facing the wheel, showing a fastening lever.

FIG. 6 is a side view of a tensioner in the form of a shuttle, connect the components of the central housing and the fastening lever.

FIG. 7 is a side view in the lower half and a sectional view along the upper half of the means for attachment to a nut of the wheel.

FIG. 10 shows another variant of the central housing and the fastening means, seen in cross-section, with certain parts being shown spaced apart.

FIG. 11 is a side view of the central housing of FIG. 10, on a slightly smaller scale, and a cross-sectional view of the means for fastening to along the line XI—XI of FIG. 10.

FIG. 12 is a perspective view of the means for fastening to the nut of the wheel, shown in FIGS. 10 and 11.

DESCRIPTION OF THE INVENTION

Figure 1:
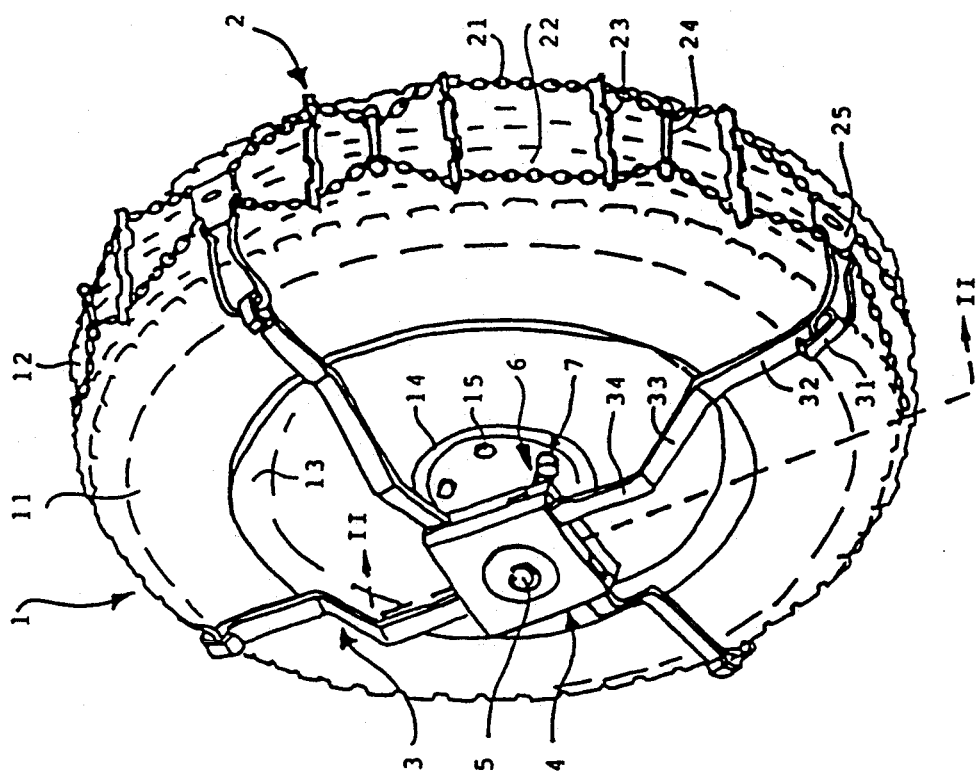
FIG. 1 is a perspective view of a wheel provided with an anti-skid device in accordance with the invention.

The device shown in FIG. 1 is mounted on a wheel 1 of a vehicle and comprises primarily an anti-skid travel path 2 held by radial arms 3 the inner end of which is fastened in a central housing 4. The central housing is traversed by an elastic tensioner 5 which cooperates furthermore with a lever 6 for the fastening of the device at a point located outside the axis A of the wheel 1, see FIG. 2. The lever 6, is for instance secured to one of the fastening nuts of the wheel by an adapter 7.

Figure 2:
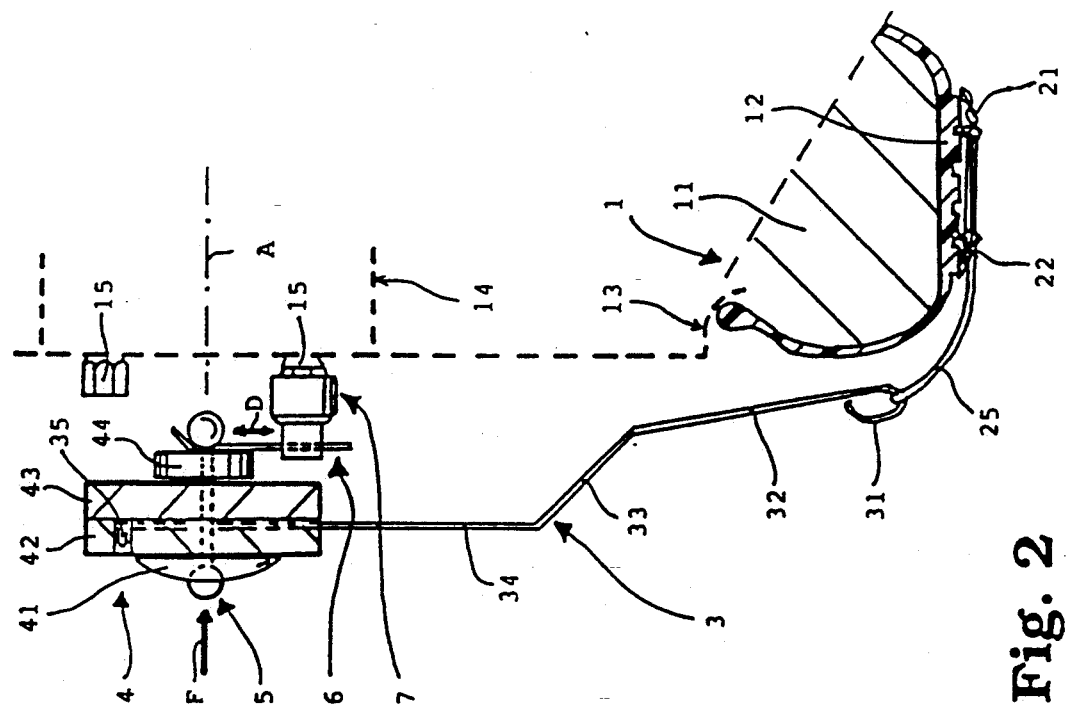
FIG. 2 is a partial cross-sectional view of the wheel and the device of FIG. 1, along the line II—II.

The vehicle wheel of FIGS. 1 and 2 has a tire 11 with a tread 12, a rim 13 and a hub 14 (as shown in dashed lines in the sectional view of FIG. 2), as well as fastening nuts 15.

The anti-skid travel path 2 is formed, as shown in FIG. 1, by two chains 21 and 22 held spaced apart from each other by bars 2 and applied against the peripheral surface 12 of the tire by elastic elements 24 which urge the chains 21 and 22 towards each other. Along the travel path there are furthermore inserted so-called chain-guide elements 25 which assure connection with the arms 3.

In FIGS. 1 and 2 there are four radial arms 3. Each of the arms has an outer loop 31 which receives a chain guide element 25, an outer part 32 in the vicinity of the tire, a bent part 33 which makes it possible to locate the central housing 4 at a good distance from the hub 14, as well as a central flat part 34 which passes through the central housing in which it is held by a right-angle bend 35, which is introduced into a corresponding opening, which will be described further below.

The central housing 4, which is shown in FIG. 2, is formed of an outer shield 41, two shells 42 and 43 which receive the radial arms 3, and an inner shield 44. All of these components have a central opening for the passage of the elastic tensioner 5, which furthermore passes through the lever 6 fastening the device to the wheel of the vehicle, so as to pull the assembly in the direction of the arrow F which is directed along the axis A of the wheel in direction of the vehicle.

As will be shown in further detail below, the lever 6 is held in a cap in adapter 7 which is fastened on one of the fastening nuts of the wheel, with respect to which it can move in the direction of the arrow D.

FIGS. 3 to 5 show in further detail the parts located on the axis of the wheel and more particularly the central housing. The flat part 34 of each of the arms 3 is partially shown, indicated by the reference numbers 341 to 344. The curved ends 351 and 353 of the arms 341 and 343 respectively can be noted in FIG. 3 while the ends 352 and 354 are visible in FIG. 5 since the opposite arms are fastened in the same shell 42 or 43.

These shells furthermore have a series of ladder openings 421 and 431 intended to receive the curved ends 351 to 354, of the radial arms, in order to be able to adjust the distance between the opposite chain guides, as a function of the different types of wheel.

In the lower part of FIG. 4 which is shown in cross-section, it will be noted that the outer shield 41 has in its central part, a central opening 411 and a hemispherical cutout 412 intended to receive the retaining ball 51 provided on the outer end of the elastic tensioner 5. The shield furthermore has a central hub 413 intended to assure its rotation with respect to the shells 42 and 43, as will be seen further below. Furthermore, the shield 41 has a radial slot 414, visible in FIG. 3, the purpose of which will be indicated further below.

The, shells, 42 and 43, which are identically manufactured, are separated by a central wall 45 and have the general shape of a square intended to receive one of the four radial arms on each face. As already mentioned, the shells 42 and 43 as well as the central wall 45 have a central opening for the elastic tensioner 5 which passes within a central hollow shaft 46 which, at each end, receives a washer 461 or 462, held by a clip 463 or 464 inserted in a groove provided for this purpose in order to connect the two shells, so that they are superimposed as shown in the drawing when the anti-skid device is used. Nevertheless, there is a slight clearance so that the user can fold the device and place it in a reduced space, the arms 341 and 343 being superimposed for instance on the arms 342 and 344. For this purpose, the central wall 45 is provided in its four corners with a shoulder 452 intended to engage in a corresponding cutout 422 provided in the shell 42 in order to assure easy rotation between the shell 42 and the shell 43. It will be furthermore noted in the cross-sectional view of FIG. 4, that the arms 342 and 344 are slipped into parallel cutouts 432 and 434 provided in the shell 43, these cutouts debouching into the ladder openings 431 visible in FIG. 5, intended to receive the curved ends 352 and 354 respectively.

The inner shield 44 is formed of a cylindrical pellet having a central opening 441 for the passage of the tensioner 5 and an inner wall 442, intended to rest on the washer 462. The outer face of shield 44 has cutouts (not shown in the drawing) intended to decrease the surface in contact with the lever 6, so as to facilitate the movement of rotation of the latter with respect to the inner shield 44 and therefore to the assembly of the housing 4. The thickness of the shield 44 is so selected that the central housing is correctly positioned with respect to the wheel to be equipped and, more precisely, to the bolt on which it will be fastened.

The elastic tensioner 5 has the shape of a shuttle formed of two retention balls 51 and 52 connected by a central chord 53. In the detailed showing of FIG. 6 it will be noted that the balls are extended at the outside by links 54 having a hole 55 intended to receive a positioning tool before being cut off along the dashed lines indicated in FIG. 6. It goes without saying that the elastic tensioner 5 will be made of a material which retains its elastic properties under severe cold.

The lever 6 for attachment to the wheel of the vehicle is formed of a part the shape of which is visible in cross-section in FIG. 4 and which has a tail 61 which extends beyond the central housing 4, an inclined part 62 extending on the other side of the axis of the central housing and terminating in a handle 63 arranged in a plane substantially parallel to the plane of the tail 61. At the end of the tail 61 there can be provided a boss 611, the purpose of which will be indicated further below. The inclined part 62 has a central passage 621 extending on the one hand into the part 61 by an amount corresponding to the diameter of the central chord 53 and on the other hand to a circular opening 631 made in the handle 63 and of a diameter corresponding substantially to the retention ball 52. A plug 64 is provided to close the opening 631, as shown in the sectional view of FIG. 4, while the plug is not shown in FIG. 5 in order not to clutter the drawing.

The angle of inclination of the part 62 permits the displacement of the lever 6 in the direction indicated by the arrow f without the handle 63 and its plug 64 coming against the parts of the central housing.

As already mentioned, the lever 6 is fastened to the wheel 1 outside the axis of the latter, for instance on one of the bolts 15. FIG. 7 shows an adaptor which is suitable for this purpose. It has a slit ring 71 having on the inside six flats 711 and on the outside a conical thread 712 intended to cooperate with a conical internal thread provided in a cap 72. Towards the outside, the cap 72 has a fastening bridge 73 for the lever 6, this bridge having a passage 731 into which the tail 61 can be freely introduced with play, as shown in FIG. 7. It will be seen to it that the passage 731 is arranged radially with respect to the axis of the wheel. It should be noted that, due to the flexibility conferred by this elastic system of attachment, the tail 61 can pass from the position shown in FIG. 5, in which it is substantially perpendicular to the elastic tensioner, to the slightly inclined position shown in dashed lines in FIG. 7. It will be noted in that figure that the boss 611 makes it possible to assure the holding of the end of the lever 6 in the adaptor 7.

In the embodiment shown in FIGS. 8 and 9 the main variants are as follows:
- the elastic tensioner 5 is a coil spring 56
- the lever 6 is straight and no longer bent
- the inner shield 44 is eliminated
- the adaptor 7 is of a different design.

It goes without saying that these variants can also be introduced individually, by combining the parts of the different figures shown in the drawing.

Figure 8:
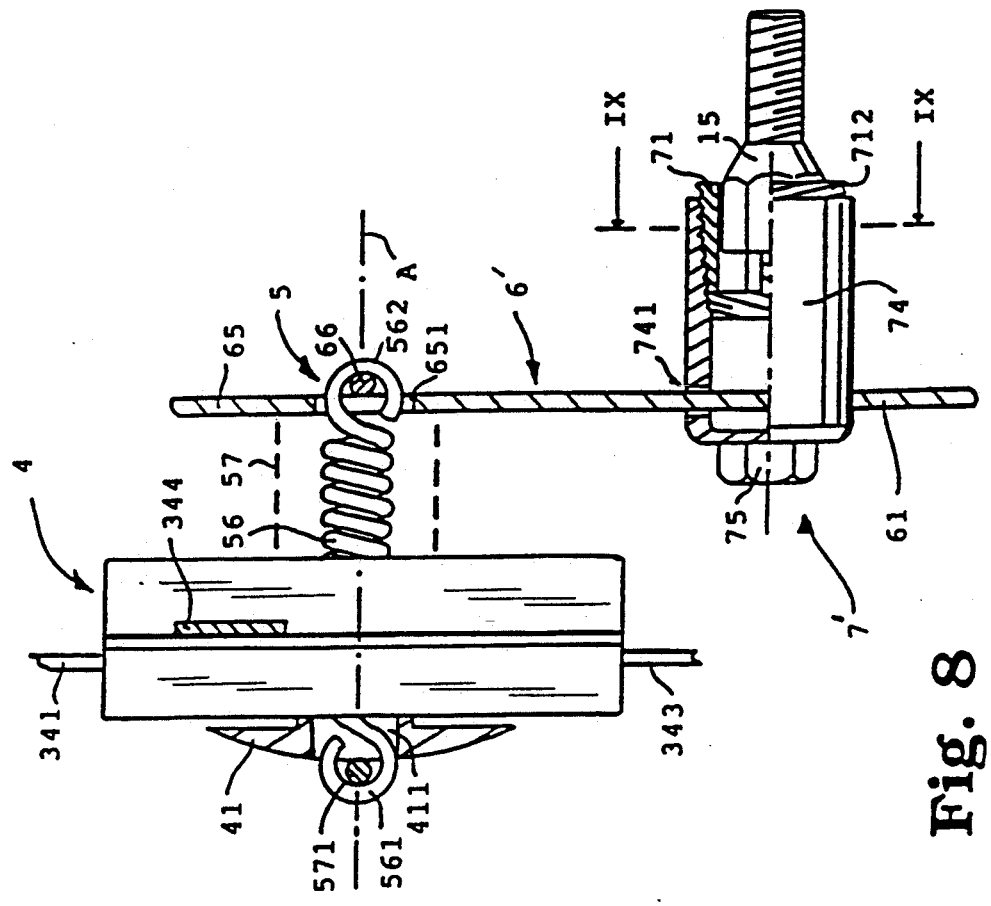
FIG. 8 is a partial cross-sectional end view of a variant of the central housing, as well as a partial cross-sectional view of a variant of the means of attachment to a nut of the wheel.

The elastic means for the pulling of the housing along the axis A of the wheel are formed, in the showing of FIG. 8, by a coil spring 56 having at each of its ends a turn 561 or 562 permitting the connection between the central housing 4 and the wheel, and more particularly its bolt 15. Furthermore the coil spring 56 can be protected by a bellows 57 arranged between the housing 4 and the lever 6 and diagrammatically indicated in dashed lines in the drawing.

The outer turn 56 protrudes through the central opening 411 of the outer shield 41 and is held by a fastening pin 571. In this variant it is not necessary for the shield 41' to have a radial slot, as was previously the case. The inner turn 562 extends beyond the lever 6' and is fastened by a pin 66, as will be seen further below. The advantage of the mounting with a helical spring over the elastic shuttle of FIGS. 3 to 6 is that it assures a better centering of the housing with respect to the wheel.

As can be noted from FIG. 8, a straight lever 6' can be used one of which extends beyond the housing 4 and has the tail 61 intended for fastening to the adaptor 7' for in turn fastening to the bolt 15. The part 65 of the straight lever facing the housing 4 has a slot 651 permitting the passage of the turn 562 of the coil spring 56 which is fastened by the pin 66. This pin 66 may have bent ends 661 on both sides of the lever 65.

Figure 9:
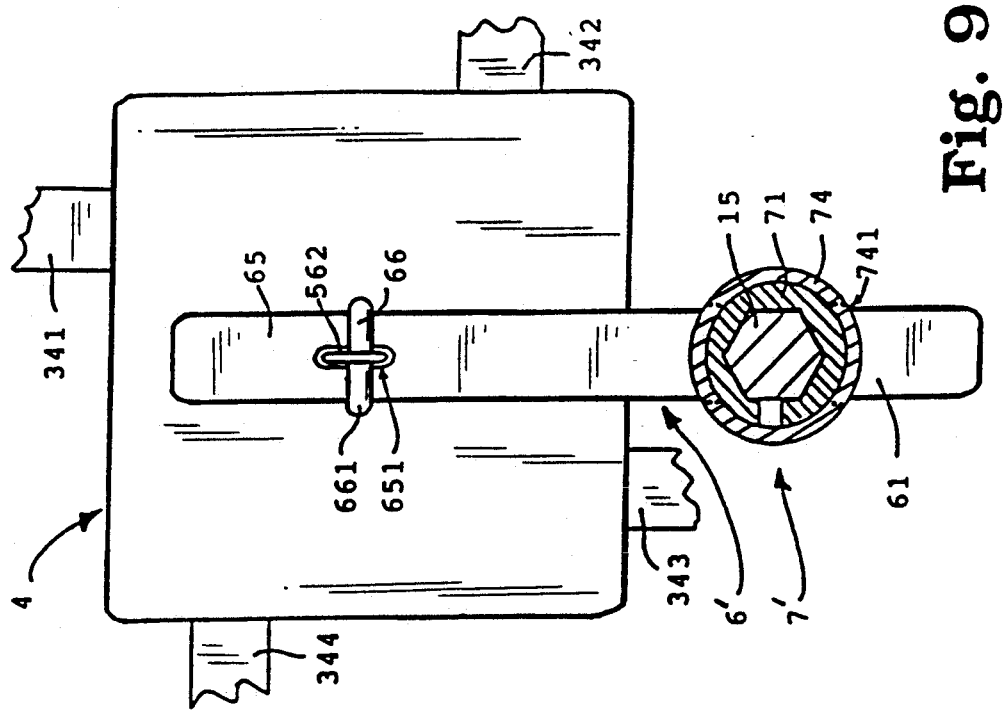
FIG. 9 is a side view of the central housing of FIG. 8, and a cross-sectional view of the means of attachment to the nut in section along the line IX—IX of FIG. 8.

The adaptor 7' of FIGS. 8 and 9 comprises, like the one previously described, a slit ring 71 with conical thread 712 intended to cooperate with a cap 74, the end of which has on the outside the shape of a bolt 75 with six flats of dimensions, corresponding to those of the fastening nuts of the wheel, so as to be clamped by means of the same tools. The cap 74 furthermore has a diametral opening 741 intended for the free passage of the tail 61 of the lever 6'. It goes without saying that the adaptor 7' will be arranged on the nut in such a manner that the opening 741 is directed towards the axis A of the wheel.

In the embodiment shown in FIGS. 10 to 12, the principal variants, as compared with the embodiments described up to now, are the following:
- the four radial arms 3 are replaced by two elongated bars extending on both sides of a central opening
- the central housing 4' is formed of two cylindrical bodies connected by a protective bellows
- the lever 6' has a grasping loop
- the adaptor 7' is of slightly different design.

The radial arms 3 are formed by two bars 36 and 37 which extend symmetrically on both sides of a central opening 38 or 39. This variant, on the one hand, permits a saving in arrangement space since the parts 36 and 37 can be fully superimposed and it furthermore facilitates the deployment and arrangement of the anti-skid device. At their outer ends (not shown in the drawing), the bars 36 and 37 cooperate with chain guides 25, such as described with reference to FIG. 1.

The central housing 4 is formed of two cylindrical bodies 47 and 48 connected by a protective bellows 49. It is closed at its ends by two shields 41" and 44".

The outer cylindrical body 47 is intended to receive the radial arms 36 and 37. For this purpose it has on the outside a bearing surface of a diameter slightly less than the central openings 38 or 39 of the arms, as well as two grooves intended to receive circlips 471 and 472. Three washers 473 are inserted between the circlips and the bars. The body 47 furthermore has a groove 474 intended to receive the shoulder 491 located at one end of the bellows 49. On the inside, the cylindrical body 47 has a helical recess 475 intended to receive a coil spring 58 the end 581 of which is folded towards the inside and holds the outer shield 41. The recess 475 flares into a frustoconical recess 476 which permits a slight movement of the spring 58. The shield 41 has a cover cap 415 and a central cylindrical plug 416 intended to be clamped in the spring 58. The plug 416 is a diametral slot 417 intended for the passage of the end 581 of the spring 58.

The inner cylindrical body 48 is intended to receive the central part of the fastening lever 6' which is held by means of circlips 481 and 482 in grooves identical to those previously described. A washer 483 and a wear shim 484 are also provided in order to permit rotation of the lever 6" with respect to the housing 4" when the latter is driven in rotation by the displacement of the chain path on the periphery of the tire. The body 48 has an outer groove intended to receive the shoulder 492 of the bellows 49. On the inside, the cylindrical body 48 also has a helical recess 85 cooperating with the coil spring 58, the end 582 of which is bent towards the inside and receives the inner shield 44. The latter has a closure cap 445 and a central plug 446 intended to be introduced into the spring 58. The cylindrical plug 446 has a diametral slot 447 intended to provide free passage for the end 582 of the spring 58. The recess 485 flares into a frustoconical passage 486 permitting a slight movement of the spring 58.

The bellows 49 serves, as has been seen, as a connection between the cylindrical bodies 47 and 48 and avoids the entrance of foreign bodies (dust or snow) into the mechanism. It deforms in length when the spring 58 is distended and permits a slight non-alignment of the cylindrical bodies or, in other words, of the body 47 bearing the arms, and therefore the chain on the one hand and the body 48 which is indirectly attached to the wheel on the other hand.

The cylindrical bodies 47 and 48 are preferably metallic, for instance, of brass; the bellows 49 consists of a rubber-base material which retains its elasticity even at very low temperatures; the shields 41 and 44 are plastic.

The lever 6" can be described in three parts, with reference to FIGS. 10 and 11. It comprises a tail 61 intended for the removable connection to the adaptor 7" fastened on the bolt of the wheel. Its central part 67 is widened and as an opening of a diameter greater than the bearing surface of the body 48, with respect to which it can turn. Finally, the lever has a loop 68 facilitating the grasping thereof when the user introduces it into the adaptor 7". It is to be noted that the end of the lever 6" having the loop 68 forms a slight angle towards the outside so as to facilitate the handling thereof.

The adaptor 7" intended for the fastening of the assembly described on the bolt 15 of the wheel is clearly visible in FIGS. 10 and 12. It consists of a slit ring 71, a tubular body 76, and a plug 77. As already described, the slit ring 71 has on the inside six flats 711 and on the outside a conical thread 712. The tubular body 76 has a conical inner thread 76 which makes it possible to tighten the slit ring on the head of the nut 15. It also has a passage along the axis 761 formed of two slots 763 and 764, which is intended to create a space into which the tail 61 of the lever 6 can be introduced. When the adaptor is put in place it will be seen to it that the axis 761 is directed towards a point located on the axis A of the wheel. The plug 77 is provided with a bearing surface 771 intended for its clamping at the end of the tubular body 76.

Before being placed on the market, the anti-skid device is assembled in the following manner. The anti-skid travel path 2 is fastened to the end of the radial arms 3, as shown in FIG. 1. The flat parts 341 to 344 of the arms are introduced into the corresponding cutouts 421 or 431 and the assembly consisting of the two shells 42 and 43, as well as of the central wall 45, are fastened around the hollow shaft 46 by means of the washers 461 and 462, held by the circlips 463 and 464 in the grooves provided for this purpose at the ends of the tube 46.

In the variant shown in FIGS. 3 to 5, the central chord 53 of the elastic shuttle 5, as shown in FIG. 6, is introduced into the radial slot 414 of the shield 41. The retaining ball 52 is introduced, by its link 54, in succession into the hollow shaft 46, through the central opening 441 of the inner shield 44, and through the circular opening 631 provided in the handle 63. It is then possible to cut the links 52 at the two ends of the tensioner 5, they serving solely to facilitate the positioning of the latter by permitting deformation by elongation thereof. By reason of the special shape of the lever 6, as soon as the tensioner acts to clamp the components arranged between the retaining balls 51 and 52, the lever 6 passes substantially into the position shown in FIG. 4. The plug 64 is then put in place in the opening 631, for a two-fold purpose. On the one hand, in order to avoid that, during the manipulations of the placing and removal of the device in accordance with the invention, the opening 631 permits the retaining ball 52 to escape. On the other hand, to facilitate the gripping of the handle 63 during these same manipulations.

In the variant shown in FIGS. 8 and 9, the spring 56 is introduced into the opening 411 of the outer shield 41, passes through the central housing 4 and through the bellows 59 before passing through the slots 651 in the straight lever 65. The spring is fastened by the pins 571 and 6 in the customary manner.

In the variant shown in FIGS. 10 to 12, the arms 36 and 37 are fastened on the cylindrical body 47 by means of circlips 471 and 472, after the putting in place of the washers 473. The coil spring 58 is screwed into the helical recesses 475 and 485 while the ends 491 and 492 of the bellows 49 are inserted into their corresponding grooves of the bodies 47 and 48. The lever 6" is fastened by means of the circlips 481 and 482 after the putting in place of the washer and of the wear shim 483 and 484. Finally, the plugs 41 and 44 are pushed into the two ends of the device.

The different anti-skid devices in accordance with the invention which have been described up to now can then be placed on the market. Before being able to use it, it will still be necessary to equip one of the nuts of each wheel with one of the adaptors shown in FIG. 7, 8 or 12, seeing to it that the diametral passage 731, 741 or 761 respectively, into which the tail 61 will be introduced is oriented in the direction of a point located on the axis A of the wheel.

When the user must install the anti-skid device in accordance with the invention he, in known manner, places the anti-skid travel path 2 on the periphery of the wheel 1, except in the lower part which rests on the ground. He introduces the tail 61 into the passage 731, 741, or 761 of the adaptor so as to arrange the central housing substantially on the axis A of the wheel. As soon as the vehicle is moved, the chain is automatically put in place due to the traction exerted by the elastic tensioner 5.

During the movement of the vehicle, it is known that the anti-skid travel path 2 has a tendency to move along the peripheral surface of the tire. In the case shown in FIGS. 3 to 5, the lever 6, the elastic tensioning shuttle 5, as well as the outer shield 41, remain substantially integral with the hub of the wheel, while the other components of the central housing (and more particularly, the shells 42 and 43 in which the arms bearing the chains are fixed) can be driven in rotation in order to permit the relative movement of the chain with respect to the wheel.

In the variant shown in FIGS. 10 to 12, the lever 6" can turn with respect to the body 48 and remains fastened to the wheel while the other parts of the device remain fastened to the chain.

In addition to the simplified assembling in accordance with the present invention, the relative movement between the part 61 of the lever and the adaptor into which the latter is introduced permits a slight displacement, on the one hand, radially along the arrow D in FIG. 2 and on the other hand, substantially along the axis of application of the force F, due to the pivoting of the assembly in the direction of the arrow f shown in FIG. 4.

In a variant not shown in the drawing, a U-shaped lever could be provided one of the arms of which is integral with the housing and the other arm of which corresponds to the extension 61. This variant would permit the fastening of an anti-skid device in accordance with the invention onto a wheel fastened by a single central bolt.

I claim:

1. An anti-skid device for a vehicle wheel, comprising:
    a housing capable of being removably fastened on an outer side of the wheel;
    a plurality of radial arms having opposed ends, one of each of said ends being fastened in said housing;
    anti-skid means connected with the other ends of said plurality of radial arms and extending along a peripheral tread surface of the wheel;
    elastic pulling means extending through the housing and adapted to turn freely with respect to the housing and capable of pulling the housing in a direction towards the wheel upon advancement of the vehicle, so as to place the anti-skid means on the peripheral tread surface of the wheel;
    fastening means connected with the wheel for fastening the housing on the wheel, said fastening means including a passage radial with respect to the axis of the wheel;
    a lever extending between the housing and the wheel and connected to the housing by said elastic means, said lever having an extension which extends through said radial passage to slide freely relative to the fastening means.

2. A device according to claim 1, wherein the extension of the lever slides radially with respect to the axis of the wheel and includes means for preventing the extension from being removed from the radial passage.

3. A device according to claim 1, wherein the fastening means comprise a split ring capable of being fitted on a fastening bolt of the wheel, said fastening bolt having an outer conical thread; and a cylindrical body having an inner conical thread for cooperation with the outer thread of the fastening bolt.

4. A device according to claim 3, wherein said cylindrical body includes grasping means for grasping the cylindrical body with a tool.

5. A device according to claim 1, wherein the elastic means are formed of an elongated body, one end of which extends through said housing and the other end of which extends through said lever.

6. A device according o claim 5, wherein said housing has a central opening traversed by said elongated elastic body.

7. A device according to claim 6, wherein the housing includes an outer shield adapted to turn with said elastic body with respect to the housing and the plurality of arms bearing the anti-skid means.

8. A device according to claim 5, wherein said elastic body is formed of a shuttle arranged between two retention balls.

9. A device according to claim 5, wherein said elastic body is formed of a coil spring.

10. A device according to claim 1, wherein the housing comprises two cylindrical bodies, one of said bodies receiving the plurality of radial arms and the second of said bodies receiving the lever, respectively, each of said bodies having means for fastening said elastic means thereto.

11. A device according to claim 10, wherein said elastic means comprise a coil spring having opposed ends and each of the bodies has, on its inside, a helical recess which receives one of the ends of said coil spring.

12. A device according to claim 11, wherein outer turns of the ends of the spring are bent towards the inside of the spring and a shield is held within each of the ends of the spring by the outer turns.

13. A device according to claim 10, further comprising a protective bellows arranged between said two cylindrical bodies.

14. A device according to claim 1, wherein said plurality of radial arms comprises two pairs of radial arms, each pair of radial arms being formed by a bar which extends from both sides of a central opening.

* * * * *